United States Patent [19]

Yang et al.

[11] Patent Number: 5,006,421
[45] Date of Patent: Apr. 9, 1991

[54] METALIZATION SYSTEMS FOR HEATER/SENSOR ELEMENTS

[75] Inventors: Kuang L. Yang; David Gutierrez, both of Newport News; George E. Gimpelson, Williamsburg, all of Va.

[73] Assignee: Siemens-Bendix Automotive Electronics, L.P., Troy, Mich.

[21] Appl. No.: 257,074

[22] Filed: Sep. 30, 1988

[51] Int. Cl.$^5$ .............................................. H01C 7/02
[52] U.S. Cl. ..................... 428/641; 428/615; 428/660; 428/661; 428/664; 428/669; 338/308
[58] Field of Search ................. 338/308; 428/641, 629, 428/672, 929, 665, 931, 666, 615, 670, 660, 661, 664, 669; 427/383.9, 101, 103

[56] References Cited

U.S. PATENT DOCUMENTS

| | | | |
|---|---|---|---|
| H546 | 11/1988 | Schnable et al. | 419/7 |
| 3,540,920 | 11/1970 | Wakefield | 428/641 |
| 3,664,874 | 5/1972 | Epstein | 428/641 |
| 4,127,840 | 11/1978 | House | 338/4 |
| 4,194,174 | 3/1980 | DeLise | 338/308 |
| 4,391,846 | 7/1983 | Raymond | 427/101 |
| 4,569,742 | 2/1986 | Schuetz | 338/308 |
| 4,580,439 | 4/1986 | Manaka | 338/34 |
| 4,682,143 | 7/1987 | Chu et al. | 338/308 |
| 4,701,769 | 10/1987 | Nishiguchi et al. | 338/308 |
| 4,746,896 | 5/1988 | McQuaid et al. | 338/308 |
| 4,760,369 | 7/1988 | Tiku | 338/308 |
| 4,803,457 | 2/1989 | Chapel et al. | 338/308 |
| 4,804,438 | 2/1989 | Rhodes | 156/653 |

FOREIGN PATENT DOCUMENTS

| | | | |
|---|---|---|---|
| 283504 | 10/1966 | Australia | 338/308 |
| 0016263 | 1/1980 | European Pat. Off. | |
| 3814432 | 11/1988 | Fed. Rep. of Germany | 338/308 |
| 50-88529 | 7/1975 | Japan | 338/308 |
| 1152683 | 5/1969 | United Kingdom | 338/308 |
| 2181298A | 4/1986 | United Kingdom | |

OTHER PUBLICATIONS

Lee et al, "Silicon Micromachining Technology . . . " SAE Technical Papers, pp. 1-10.
Allan, Roger, "Sensors in Silicon", High Technology/-Sep. 1984, pp. 43-77.
Collins et al, "Tantalum and Cobalt Silicides: Temperature Sensor Applications", Applied Physics A. Solids & Surfaces, vol. A40, No. 2, Jun. 1986, pp. 109-117.

*Primary Examiner*—John J. Zimmerman
*Attorney, Agent, or Firm*—Nixon & Vanderhye

[57] ABSTRACT

Device comprising a substrate and a metallized sensor/heater element having a temperature coefficient of resistance of at least 2000 parts per million. Methods of fabricating the devices are also disclosed.

9 Claims, 3 Drawing Sheets

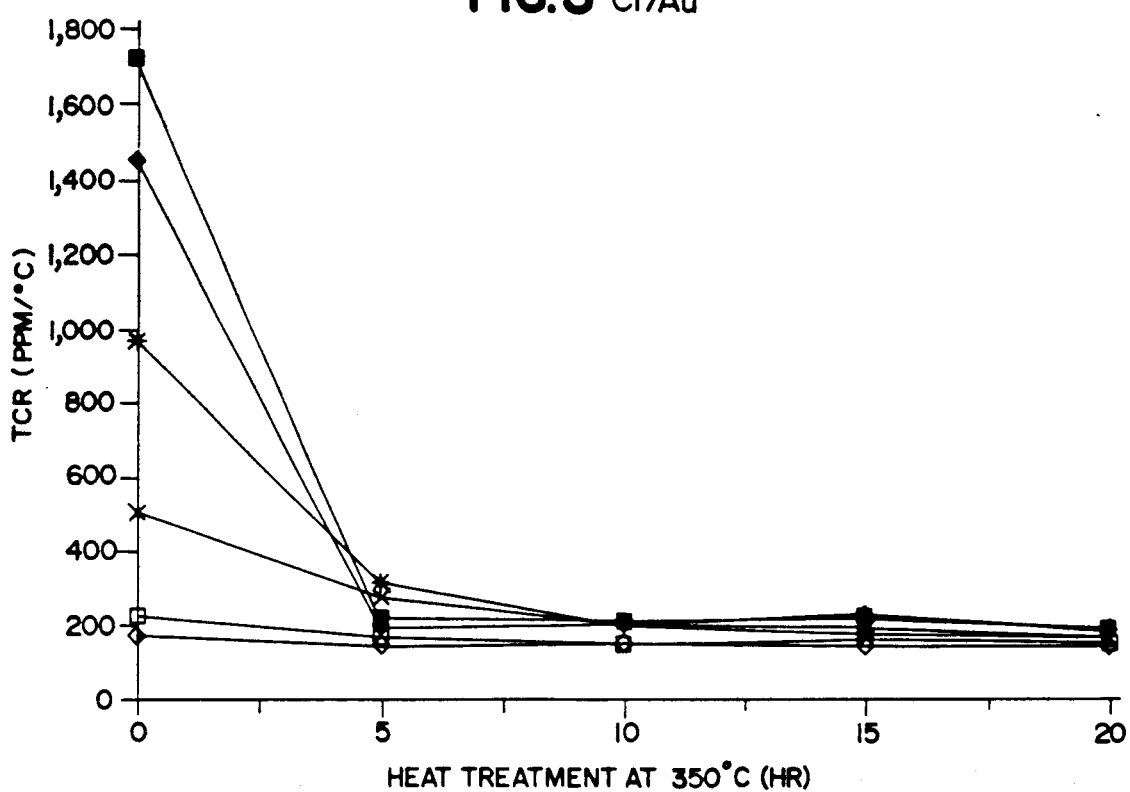
FIG.3 Cr/Au
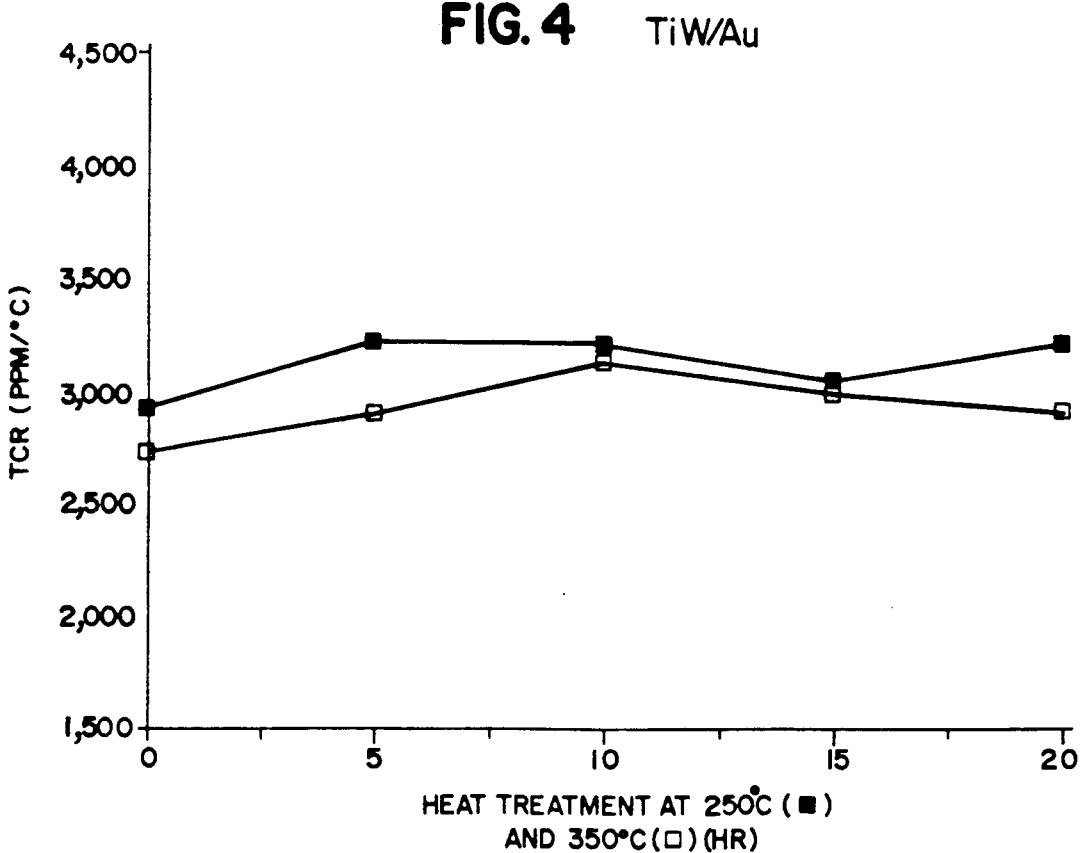
FIG. 4 TiW/Au

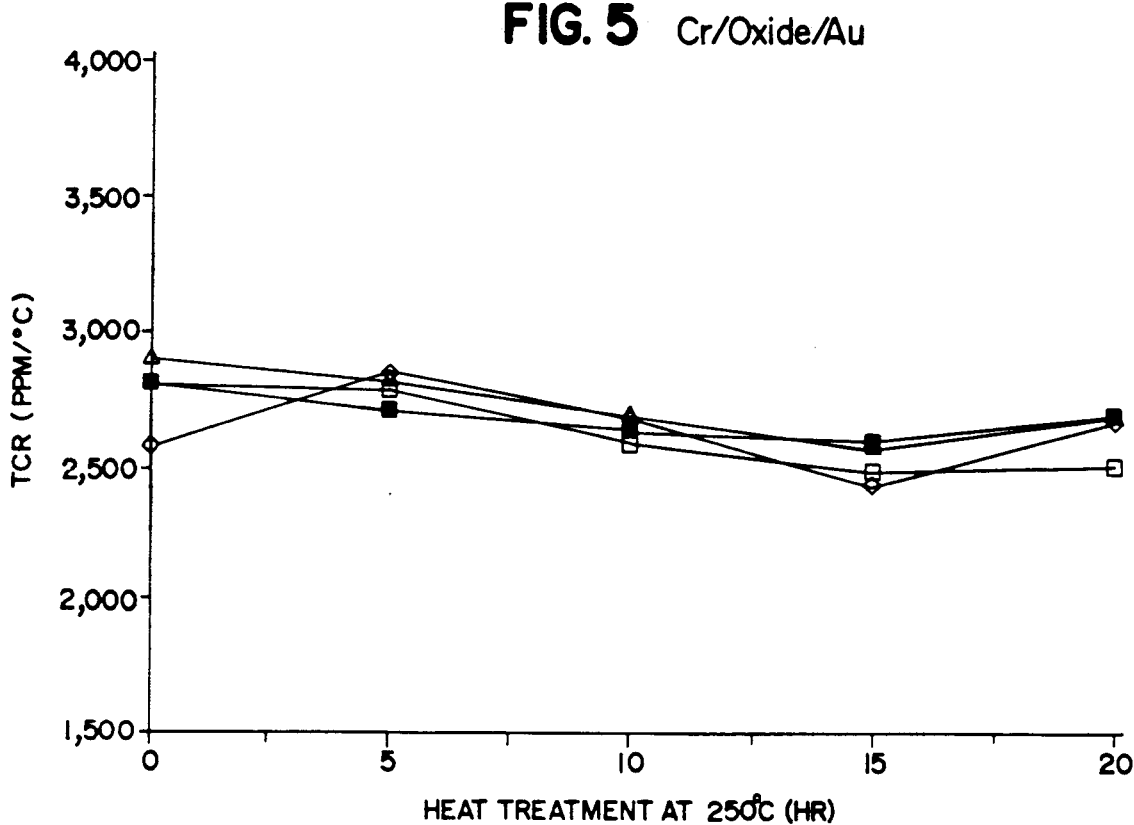
FIG. 5 Cr/Oxide/Au
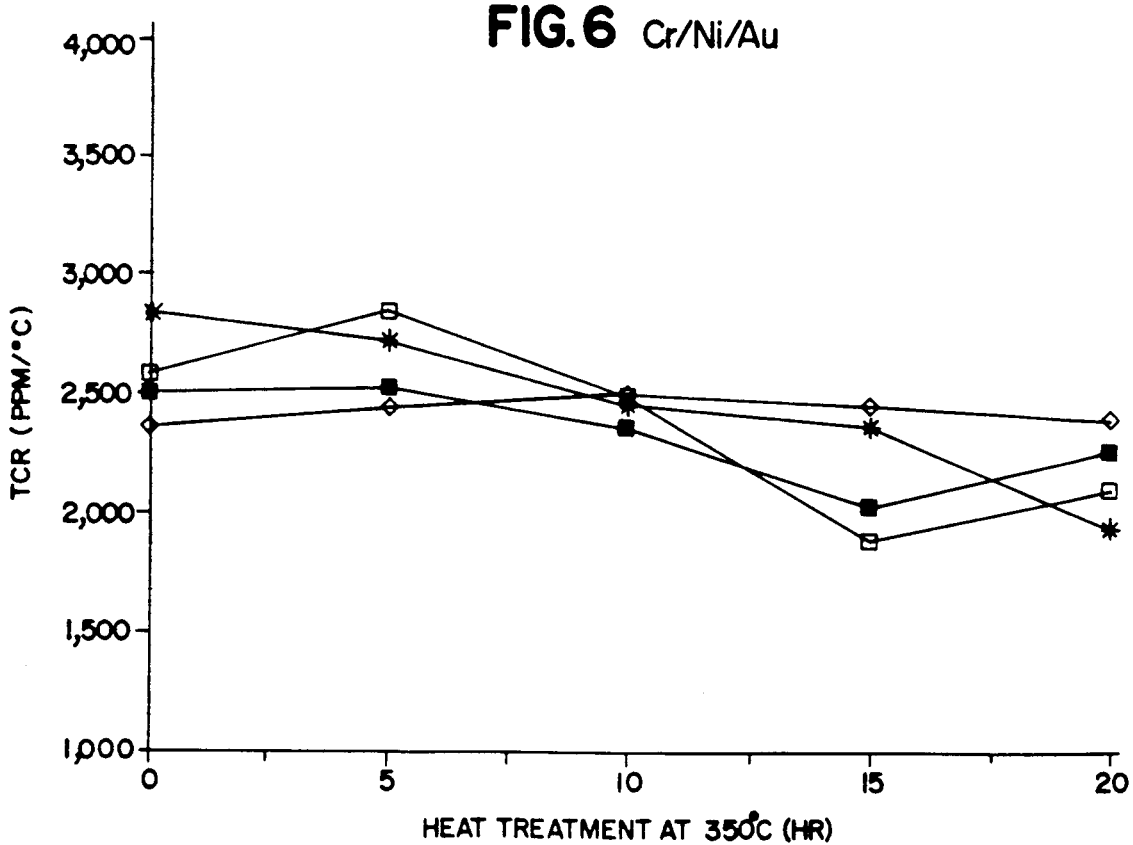
FIG. 6 Cr/Ni/Au

METALIZATION SYSTEMS FOR HEATER/SENSOR ELEMENTS

FIELD OF THE INVENTION

The present invention relates to metallized sensor/heater elements having improved physical and chemical properties, and to their fabrication.

BACKGROUND OF THE INVENTION

Silicon-based electronics systems have become increasingly important in recent years, especially for automotive applications. These silicon-based electronics are used principally for storing control algorithms, process information and for directing actuators to perform various functions, including steering, suspension and display of driver information, to name but a few. While the design of electronics has advanced rapidly, the development of sensor technology has not proceeded at the same rate, and sensor designs continue to be based on dated technologies which have inbred limitations. Silicon has recently been identified as the basis for future sensor technology, and this hopefully will close the technology gap and permit greater application of control systems utilizing sensor technology.

Silicon is now widely recognized in the industry as being suitable for use in silicon-based electronics, and silicon sensor designs can now be created using a variety of manufacturing processes, one of the most promising of which is referred to as "micromachining" which uses chemical processes to introduce three-dimensional mechanical structures into silicon. These "microstructures", as they are referred to, can be made sensitive to specific physical phenomena, such as acceleration, pressure and fluid flow, so that it is possible to fabricate accelerometers, pressure sensors and mass air flow sensors (MAFS), including hot wire anenometers and fuel flow rate detectors. Different aspects of micromachining are reviewed in Lee et al, "Silicon Micromachining Technology for Automotive Applications", SAE Publication No. SP655, Feb. 1986, and the content of that publication is hereby incorporated by reference.

In order to improve the performance of such devices, it is important for the heater/sensor element to have a substantially constant and preferably highly linear temperature coefficient of resistance, which does not change with thermal ageing. In the past, gold has been used as the heater/sensor element but this has not met with acceptance due to the fact that gold is not compatible with most semiconductor processes, and has a low resistivity, thereby requiring a long resistor which uses valuable real estate on the silicon wafer. Attempts have been made to improve the metallization characteristics of gold when used in conjunction with semiconductors by using a chromium/gold metallization system, but this too has proved unsuccessful because of interdiffusion characteristics at temperatures higher than about 200° C. Since mass air flow sensors are usually operated at temperatures of at least 200° C., the material used for sensing and heating elements in such sensors must have stable electric characteristics under those heat conditions and, in particular, must exhibit a stable thermal coefficient of resistance and sheet resistivitY (R-sh).

SUMMARY OF THE INVENTION

It has now been found, according to the present invention, that it is possible to fabricate metallized sensor/heater elements having substantially constant and linear temperature coefficient of resistance properties and high sheet resistivity, while at the same time being compatible with semiconductor processes used to fabricate the elements.

According to one aspect of the present invention, there is provided a metallized sensor/heater element having a temperature coefficient of resistance of at least 2000 parts per million.

According to another aspect of the present invention, there is provided a semiconductor device comprising a metallized sensor/heater element having a temperature coefficient of resistance of at least 2000 parts per million.

According to yet another aspect, the invention provides a metallized element comprising a layer of a first metal in contact with a surface of a substrate and a layer of a second metal in contact with the first layer, with the metallized element having a temperature coefficient of resistance of at least 2000 parts per million.

The invention also provides a method of metallizing a sensor/heater element, which comprises the step of depositing at least one metal-containing layer on a substrate to produce a metallized element having a temperature of coefficient of resistance of at least 2000 parts per million.

In a preferred aspect, a metallization system is employed which is selected from a metal system and a silicide system each having a temperature coefficient of resistance of at least 2000 parts per million.

The temperature coefficient of resistance (hereinafter TCR) of the metallized heater/sensor elements of the invention is at least 2000 parts per million, and can be at least 3000 parts per million. Usually, the TCR is 2200 to 3500 parts per million, preferably 2400 to 3200 parts per million. The TCR is substantially linear at values of at least 2000 parts per million when the element is heated at elevated temperatures, typically at least 200° C., over an extended period of time, which may be as short as 5 hours and as long as 100 hours. This is to be contrasted with the TCR of the known chromium/gold system which has an initial value at room temperature of about 1800 parts per million, and which drops dramatically after about 5 hours of heating at about 350° C. to around 350 parts per million or less (see FIG. 3).

The metallization systems of the present invention can be divided into two broad categories, namely those based on metals per se and on metals per se in association with metal-containing materials, such as metal oxides (referred to herein as metal systems), and those based on metal silicides (referred to herein as silicide systems).

The metal systems of the invention can comprise metals and metal-containing compounds such as metal oxides. Preferred metals are refractory metals, such as titanium, tungsten, molybdenum, hafnium, zirconium and chromium, and noble metals, such as palladium, gold and platinum. It is particularly preferred to utilize multiple layers of refractory and/or noble metals, such as in the sensors mentioned above having first and second metals. In those structures, the first metal, which is typically in contact with a diaphragm of a semi-conductor device such as a mass air flow sensor, is preferably a refractory metal, such as titanium, tungsten, molybdenum and hafnium, zirconium and chromium, or combinations of those metals, such as titanium-tungsten, and the second metal is typically a noble metal, such as gold and palladium. Particularly good results have been obtained using titanium-tungsten/gold. Good results have also been obtained if a barrier layer is between the first and second metal layers, with that barrier layer being formed from a metal-containing material, such as a metal oxide, or from another metal. Examples of such metallization systems are chromium/oxide/gold and chromium/nickel/gold layer systems. In such systems, the barrier layer is the nickel layer or the oxide layer. Particularly effective results have been obtained using the chromium/oxide/gold system in which the oxide layer is dichromium trioxide.

Referring to the silicide systems, the silicide, i.e. a compound of a metal and silicon, preferably polysilicon, is formed by depositing polysilicon onto a substrate followed by depositing the metal onto the polysilicon and heating to form the silicide. Any metal which forms a silicide may be used, provided the resulting silicided element exhibits the desired stable electrical and physical properties noted earlier. The silicide is preferably selected from platinum silicide, titanium silicide, molybdenum silicide, tungsten silicide, cobalt silicide and palladium silicide. The most preferred silicide is platinum silicide.

The metallization systems employed according to the present invention exhibit numerous advantages which make them highly desirable for use in developing sensitive and accurate heater/sensor elements. In particular, they exhibit TCR values of at least 2000 parts per million which are essentially constant upon prolonged heating, i.e. they vary no more than about 1000 parts per million, preferably no more about 400 to 600 parts per million, when heated for at least about 15 hours at at least about 250° C. In addition, good thermal stability and resistance to thermal ageing are shown by the sensors metallized according to the present invention, and high sheet resistivity is also exhibited, typically of the order of 0.2 ohm/square to 5 ohm/square for metal systems based on a metal thickness of 3000 Angstroms, and about 2.0 to 2.5 ohm/square for silicide systems, for example platinum silicide, for a layer thickness of about 1000 Angstroms. This means that the sensor elements can be made much shorter and thereby occupy considerably less real estate on the silicon wafer. Furthermore, sensors metallized according to the present invention do not exhibit electromigration problems and also have excellent corrosion resistance and high melting points. These advantages mean that interdiffusion problems, ordinarily associated with chromium/gold layers, are significantly reduced in the metallized sensors of the present invention. In light of this, while a barrier layer may be employed, as noted earlier, it is not required to employ a barrier layer to prevent interdiffusion occurring, as is invariably required when using chromium/gold layers.

The stable temperature coefficient of resistance properties and sheet resistivity exhibited by the sensors metallized according to the present invention are not shown by elements metallized using chromium/gold layers (see FIG. 3). In addition, with chromium/gold layers, it has been observed that the sheet resistivity increases with increasing temperature while the temperature coefficient of resistance decreases with increasing temperature. This does not occur with the metallized elements of the present invention.

A further advantage arising from the present invention is that the metallization can be carried out at low temperatures, typically not higher than 500° C., and more usually in the region of 350 to 400° C. This makes the metallization process compatible with emerging silicon-based sensor technology whereby integrated silicon sensors can be processed without subjecting electronics already present on the sensor to heat damage. The metallization systems of the invention exhibit low contact resistance, and thereby form good ohmic contact, and exhibit particularly good adhesion to silicon or silicon dioxide present on a wafer.

BRIEF DESCRIPTION OF THE DRAWINGS

The invention will now be described with reference to the accompanying drawings, in which:

FIG. 3 is a graph showing the effect of heat treatment on the temperature coefficient of resistance of chromium/gold;

FIG. 4 is a graph showing the effect of heat treatment on the temperature coefficient of resistance of titanium-tungsten/gold;

FIG. 5 is a graph showing the effect of heat treatment on the temperature coefficient of resistance of chromium/dichromium trioxide/gold; and FIG. 6 is a graph showing the effect of heat treatment on the temperature coefficient of resistance of chromium/nickel/gold.

DETAILED DESCRIPTION OF THE INVENTION

Figure 1:
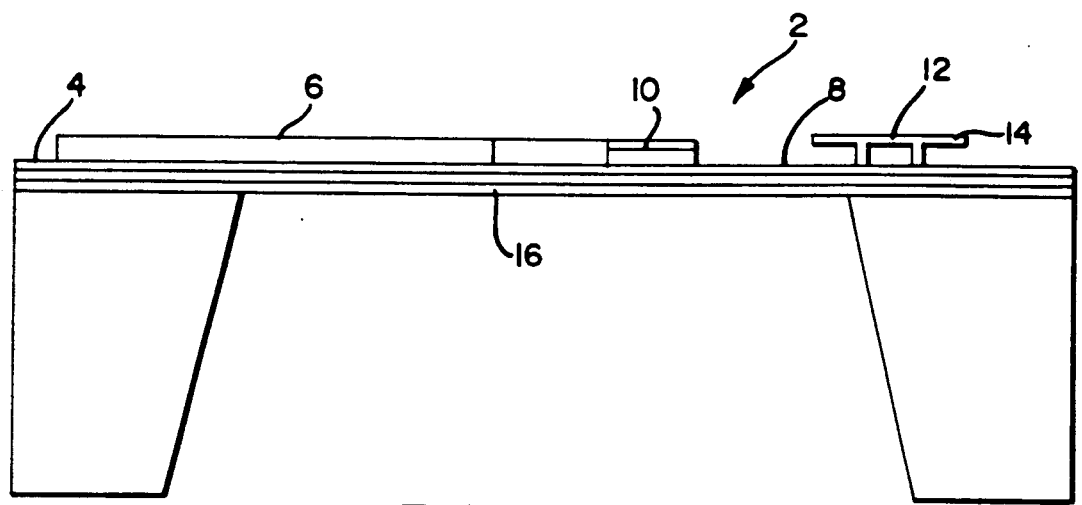
FIG. 1 is a side view of a device including a metallized element of the present invention.
Figure 2:
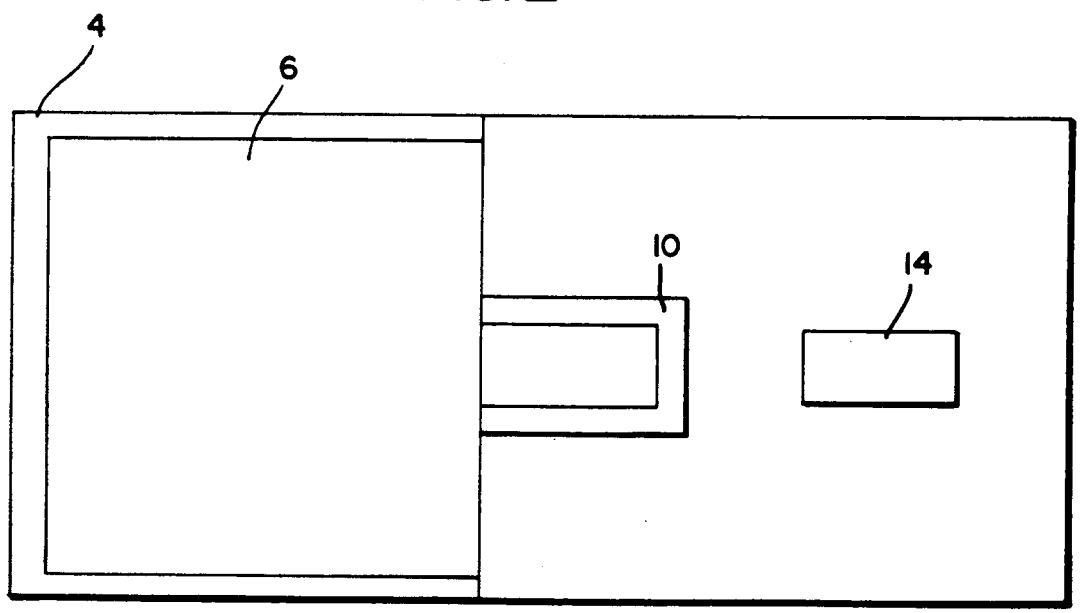
FIG. 2 is a plan view of the device of FIG. 1 showing the configuration of the metallized element.

Referring to FIG. 1, there is shown a diaphragm structure, generally referenced 2, having an area 4 containing integrated circuitry 6 and an upper surface 8 supporting a heater element 10. While the following description is in connection with the element 10 comprising a metallization system of the invention being a heater element as part of an air-flow sensor, preferably a hot-wire anemometer, it will be appreciated that the present invention is equally applicable to other sensor elements, such as a bridge structure 12 and/or a cantilever structure 14, shown schematically in FIG. 1. The mass air flow sensor shown in FIG. 1 comprises a diaphragm portion 16 which is comprised of at least 2 layers, one layer being typically of silicon dioxide and the other typically being of silicon nitride. Preferably, the portion 16 comprises three alternating layers of silicon oxide, silicon nitride and silicon oxide. By forming alternating layers of oxides and nitrides, it is possible to offset the inherent compressive stress exhibited by silicon oxide and the inherent tensile stress exhibited by silicon nitride to produce a laminated diaphragm layer with an overall low stress. This results in increased sensitivity and flexibility, so that the measurement of the speed/amount of a gas over the sensor can be accurately effected. The diaphragm structure shown in FIGS. 1 and 2 is formed by conventional back-side etching techniques, such as are reviewed in the above-mentioned paper to Lee et al, and so further discussion here is believed to be unnecessary.

FIG. 3 shows the variation of the TCR for Cr/Au as a function of time when heated at 350° C. In the graph,■ means unannealed Cr/Au ◆ means annealed at 200° C. means annealed at 350° C., annealed at 300° C.,□ means annealed at 350° C., and ◊ means annealed at 400° C.

As noted earlier, the metallization system according to the present invention can comprise either a metal system or a silicide system. Preferred metal systems are formed from refractory metals or noble metals, as noted earlier, with the particularly preferred metal system being titanium-tungsten/gold (TiW/Au). According to a preferred embodiment, this metal system is applied to the upper surface 8 of the diaphragm by first depositing on the diaphragm a layer of titanium-tungsten, in which the amount of tungsten is in excess of the amount of titanium. Usually, the tungsten is present in an amount of about 90% by weight and the amount of titanium is about 10% by weight. The titanium and the tungsten are deposited using sputter deposition techniques in vacuum at elevated temperatures, generally in the region of 200° to 450° C., usually about 250° C. The sputtering is continued until the thickness of the layer of titanium-tungsten is about 200 to 2000, preferably 500 to 1500, Angstroms, more usually about 1000 Angstroms. A layer of gold is then deposited on top of the titanium-tungsten. Typically, the gold is evaporated at about 350° C from a graphite crucible in vacuum. The evaporation of gold is continued until the thickness of the gold layer is in the region of 2200 to 3500 Angstroms, usually about 2400 Angstroms. Etching of the metallization layer(s) is then carried out using conventional techniques to form the desired shaped heater/sensor element 10.

The TiW-Au metallization system has electrical characteristics, such as TCR and R-sh, which are very stable in the temperature range of about 25° to 400° C. In particular the TCR shows a high degree of linearity over the temperature range of 25° to 400° C. and over time period of 5 to 100 hours. Moreover, the TCR at those temperatures and over those time periods was above 2000 parts per million and ranged over about 2700 to 3200 parts per million. This results in the TiW/Au system having a high TCR which is stable when heated over extended time periods. sensitive.

FIG. 4 of the present application shows the variation of the TCRs of TiW/Au over 20 hours of heat treatment at 250° C. and 350° C. It will be noted that the TCR does not vary more than about 400 to 500 parts per million over the 20 hour heating period. The TiW/Au system did not exhibit interdiffusion characteristics, which is principally due to the lower self-diffusion coefficient for each of the layers of TiW and Au. As a result of this, electromigration characteristics were minimized, thereby overcoming the problems experienced with conventional chromium/gold systems.

Another preferred metallization system is chromium/oxide/gold. It has been found that when the oxide is dichromium trioxide, the metallization system has a particularly stable and highly linear TCR at 350° C., as well as a stable R-sh. This is shown in FIG. 5, where it can be seen that the variation of the TCR over 20 hours of heating at 250° C. is no more than 600 parts per million, and is more usually 400 to 500 parts per million. In the graph, $\Delta$ means annealed at 250° C. with no further oxygen treatment, $\square$ means annealed at 350° C. with no further oxygen treatment, $\diamond$ means annealed at 250° C. with oxygen treatment and ■ means annealed at 350° C. with oxygen treatment. Surprisingly, the dichromium trioxide functions effectively as a barrier at 350° C. even when present as an extremely thin oxide layer, i.e. only 8 to 20 Angstroms, typically 12 to 15 Angstroms, thick.

The chromium/oxide/gold system is deposited on the substrate by first depositing the chromium using evaporation in vacuum at elevated temperatures, usually in the region of 250° to 500° C., more usually about 350° C. The dichromium trioxide is produced by placing the substrate with the chromium layer so formed into a furnace at about 800° to 1000° C., and introducing oxygen to oxidize a thin surface layer of the chromium and form the chromium oxide. Finally, the gold is deposited on the dichromium trioxide layer using the evaporation techniques discussed earlier in connection with the fabrication of TiW/Au systems. Annealing is then preferably carried out using a hydrogen-containing gas so as to reduce the formation of any oxide on the surface of the metallized element. Annealing is ordinarily carried out for a period of about 20 to 120 minutes, usually about 30 minutes at about 250° to 450° C., typically about 350° C. The atmosphere is ordinarily nitrogen gas containing about 4 to 8% by volume of hydrogen.

Another metallization system is the chromium/nickel/gold sytem (hereinafter the Cr/Ni/Au system). The varation of the TCR with temperature is shown in FIG. 6. This metallization system exhibits stable and essentially linear TCR properties at 350° C. over a significant period of time (20 hours). Good R-sh properties are also shown.

As noted earlier, the prior known chromium/gold metallization system suffers from interdiffusion characteristics giving rise to migration of chromium and gold atoms into the other metal at the interface of the two layers. As a result, the TCR drops drastically upon prolonged heating, as shown in FIG. 3. In the Cr/Ni/Au system, the nickel functions as a barrier layer between the chromium and the gold, thereby minimizing electromigration and interdiffusion problems.

With reference to the silicide metallization systems which may be employed according to the invention, in principle any metal may be used which will react with silicon, preferably polycrystalline silicon or polysilicon, to form a silicide. As noted earlier, numerous silicides may be employed, but the most preferred is platinum silicide. This material has numerous advantages over gold which has been widely used in the past. However, gold suffers from a number of disadvantages, the principal ones being that gold is not particularly compatible with most semiconductor processes, and gold has a low resistivity, thereby requiring large resistor dimensions which occupy valuable silicon area on the wafer. Platinum silicide, on the other hand, has a sheet resistivity (R-sh) which is at least ten times greater than the resistivity of an equally thick gold layer. Thus, the silicided sensor element can be made much shorter and will thereby occupy considerably less silicon area. Moreover, platinum silicide is made from polysilicon which is widely utilized in the fabrication of integrated circuits, and is therefore compatible with the fabrication of sensor devices on the same silicon wafer. In addition, platinum silicide is resistant to thermal stress, and can withstand temperatures in excess of 700° C. Furthermore, the TCR of platinum silicide is in the range of about 2000 to 3000 parts per million, and the TCR of platinum silicide is essentially constant upon prolonged heating, which is highly advantageous in developing flexible and sensitive sensors.

While platinum silicide is the preferred silicide, other silicides have also been shown to exhibit excellent physical and chemical properties as silicide metallization systems for sensors, particularly mass air flow sensors, pressure sensors and accelerometers. Other silicides exhibiting these excellent properties are titanium silicide, cobalt silicide, molybdenum silicide, tungsten silicide and palladium silicide. As a result of the excellent physical and chemical properties of these materials, it is possible to utilize such silicide metallization systems for contact to very shallow junctions (less than 1000 Angstroms), for first level gate and interconnect metals, and for heterostructures with semiconducting silicides. Additional advantages arising from the silicides of the invention is that they can be deposited using low temperature techniques, typically at temperatures not higher than 500° C., and more usually in the region of 350 to 450° C. Such processes include, for example, sputtering, cosputtering, CVD (chemical vapor deposition) processes, sintering processes and the like. The silicides employed in the invention have low contact resistance and form good ohmic contact, and show highly stable and essentially constant TCR properties. The silicides also exhibit high conductivity as well as excellent adhesion to silicon or silicon dioxide. In addition, the silicides exhibit excellent corrosion resistance, and do not suffer from electromigration problems.

The silicided element (for convenience of description see element 10 in FIG. 1) is preferably formed by depositing a layer of polysilicon on a substrate, such as the diaphragm 16 shown in FIG. 1 or a semiconductor silicon wafer, using conventional low pressure chemical vapor deposition. The deposition is continued until the thickness of the layer is in the region of about 3500 to 4500 Angstroms, typically about 3800 Angstroms. A layer of silicon oxide is then formed on the polysilicon layer under conventional wet oxidation conditions using steam. The polysilicon is then patterned using conventional photolithography techniques, followed by reactive ion etching (RIE). A layer of the metal is then deposited on the etched oxide/polysilicon layer. In the case of platinum, deposition may be effected by using electron beam (E-beam) or sputter deposition at elevated temperature, for example 200° to 450° C., typically at about 250° C. The resulting platinum layer has a thickness of about 800 to 2500 Angstroms, usually about 1000 to 2000 Angstroms. Sintering is then carried out at elevated temperature, ordinarily at about 350° to 600° C., typically at about 550° C., for a time period of about 10 to 35 minutes, preferably about 15 minutes to form the silicided element 10.

Annealing may be carried out either by heating to 350° to 500° C. under a nitrogen atmosphere, or by a step-wise annealing proceedure wherein the wafers are kept at about 350° C. under nitrogen for about one hour, followed by increasing the temperature to about 450° C. for about an hour, followed by heating at about 550° C. for about 30 minutes, and the cooling to about 350° C. before removing the furnace. The excess silicide is then etched using a cleaning solution, such as aqua regia (nitric acid-1 part/hydrochloric acid-7 parts/water-8 parts), for about 10 to 45 seconds, usually about 15 seconds. The aqua regia may be heated to a temperature less than 100° C., for example about 85° C. The continuity of the silicide can then be checked using a parametric tester. Particularly good results are obtained from samples with sputtered films and a long annealing sequence. In addition, pre-sputtering to clean the sample before actual deposition of the metal also improves the adhesion of the films to the polysilicon.

With particular reference to platinum, while that metal may be evaporated at room temperature, it is preferred to carry out the evaporation at elevated temperatures, for example in the region of 200° to 300° C., typically at about 250° C. The most advantageous deposition of platinum and subsequent formation of platinum silicide is achieved by first cleaning the wafer using the usual cleaning materials, typically dipping the wafer into a hydrogen fluoride solution for about 5 seconds and then rinsing. The wafer is then cleaned by carrying out a pre-sputtering step. Pre-sputtering is usually carried out by "sputtering off" or cleaning the wafer using argon ions. Following the pre-sputtering, the platinum is deposited at a temperature of about 250° C. until the layer is about a 1000 Angstroms thick. Sintering is then effected at about 550° C. for about 15 minutes under a nitrogen flow, and this is followed by subjecting the sintered material to an aqua regia etch for about 15 seconds. Optionally, titanium-tungsten/aluminum may be deposited on the platinum silicide to further enhance the metallization effect. It has been found that the use of hydrogen fluoride following sintering is not recommended as lifting of the metallized layer from the substrate may occur.

As noted earlier, the metallization systems of the present invention not only exhibit stable and essentially linear TCR properties, but also show high sheet resistivity. The sheet resistivity for the metal systems is usually in the range of 0.2 to 5.0 ohm/square for a metal layer thickness of 3000 Angstroms. The sheet resistivity for silicide systems, e.g. platinum silicide, is generally in the range of 2.5 ohm/square, more usually in the region of about 2.2 to 2.3 ohm/square after sintering and etching, based on a 1000 Angstroms thick layer of platinum on top of polysilicon.

In order to obtain an accurate TCR measurement, it is desireable to effect a minium of three resistance measurements. The third measurement is designed to determine whether any permanent resistance change has occurred as a result of the temperature treatment. The TCR is defined as:

$$TCR = \frac{R - R_0}{R_0 \times (T - T_0)}$$

wherein R is the resistance at temperature T and $R_O$ is the resistance at temperature $T_O$.

The method of measuring TCR is well known to any person of ordinary skill in the art. The techniques and theory involved are reviewed in Buehler et al, IEEE Transactions on Electron Devices, Vol. ED-33, No. 10, page 1572 (1986), the disclosure of which is hereby incorporated by reference. Van der Pauw resistor structures according to the Buehler et al teaching were employed throughout the resistance measurements at different temperatures.

We claim:

1. A metallized heater/sensor element for flow sensors comprising a platinum silicide layer having a substantially linear temperature coefficient of resistance of at least 2000 parts per million, a substrate supporting said platinum silicide layer and conductor leads attached thereto.

2. A metallized heater/sensor element for flow sensors having a substantially linear temperature coefficient of resistance of at least 2000 parts per million, the element comprising a first metal layer of a refractory metal, a second metal layer of a noble metal, a substrate supporting said first metal layer and conductor leads attached thereto.

3. A metallized heater/sensor element for flow sensors according to claim 2, wherein said refractory metal is selected from the group consisting of titanium, tungsten, molybdenum, hafnium, zirconium and chromium and said noble metal is selected from the group consisting of palladium, gold and platinum.

4. A metallized heater/sensor element for flow sensors according to claim 3, wherein said first layer is titanium and tungsten and said second layer is gold.

5. A metallized heater/sensor element for flow sensors according to claim 4, wherein said titanium is present in an amount of about 10% by weight and tungsten is present in an amount of about 90% by weight.

6. A metallized heater/sensor element for flow sensors according to claim 3 additionally including a barrier between said first and second metal layers.

7. A metallized heater/sensor element for flow sensors according to claim 6, wherein said barrier layer has a thickness in the region of 8 to 20 Angstroms.

8. A metallized heater/sensor element for flow sensors according to claim 6, wherein said barrier layer comprises a material selected from the group consisting of dichromium trioxide and nickel.

9. A metallized heater/sensor element for flow sensors according to claim 8, wherein said refractory metal layer is chromium and said noble metal layer is gold.

* * * * *